United States Patent
Lee

(10) Patent No.: US 7,586,900 B2
(45) Date of Patent: Sep. 8, 2009

(54) INTERNET PROTOCOL-PRIVATE BRANCH EXCHANGE FOR PROVIDING INTERNET MESSENGER FUNCTION AND INTERNET TERMINAL FOR USE THEREWITH

(75) Inventor: Changwoo Lee, Seoul (KR)

(73) Assignee: Moimstone Co., Ltd., Seoul (KR)

( * ) Notice: Subject to any disclaimer, the term of this patent is extended or adjusted under 35 U.S.C. 154(b) by 383 days.

(21) Appl. No.: 10/578,618

(22) PCT Filed: Dec. 2, 2004

(86) PCT No.: PCT/KR2004/003162

§ 371 (c)(1),
(2), (4) Date: Apr. 13, 2007

(87) PCT Pub. No.: WO2005/055626

PCT Pub. Date: Jun. 16, 2005

(65) Prior Publication Data

US 2008/0008158 A1   Jan. 10, 2008

(30) Foreign Application Priority Data

Dec. 2, 2003   (KR) .................. 10-2003-0086615

(51) Int. Cl.
*H04L 12/66* (2006.01)
(52) U.S. Cl. .................. 370/352; 370/360; 379/88.22
(58) Field of Classification Search ......... 370/351–356, 370/360, 362, 389; 379/67.1, 88.08, 88.22, 379/93.09
See application file for complete search history.

(56) References Cited

U.S. PATENT DOCUMENTS 6,446,127 B1 * 9/2002 Schuster et al. ............. 709/227

6,876,728 B2 * 4/2005 Kredo et al. ............. 379/88.17

FOREIGN PATENT DOCUMENTS

| EP | 0930766 A2 | 7/1999 |
| JP | 2000-102047 | 4/2000 |
| KR | 2001061383 | 7/2001 |
| KR | 2002084783 | 11/2002 |
| KR | 2003062615 | 7/2003 |

OTHER PUBLICATIONS

International Search Report for Application No. PCT/US2004/003162, dated Mar. 16, 2005.

* cited by examiner

*Primary Examiner*—Suhan Ni
(74) *Attorney, Agent, or Firm*—Lahive & Cockfield, LLP; EuiHoon Lee

(57) ABSTRACT

An instant messenger service system for providing an instant messenger service is disclosed. The instant messenger service system comprises at least one communication terminal for storing at least one instant messenger software, and using the instant messenger service through wired local area network communication and/or wireless local area network communication, a communication network being connected to the communication terminal, for supporting the wired local area network communication and/or the wireless local area network communication, and the Internet protocol-private branch exchange for providing the instant messenger service and a voice communication service between the communication terminals after being connected to the communication network, and providing the voice communication service by means of VoIP (Voice over Internet Protocol) technology when a request of the voice communication service is received from a specific communication terminal receiving the instant messenger service.

15 Claims, 6 Drawing Sheets

INTERNET PROTOCOL-PRIVATE BRANCH EXCHANGE FOR PROVIDING INTERNET MESSENGER FUNCTION AND INTERNET TERMINAL FOR USE THEREWITH

This application is a 35 U.S.C. 371 national stage filing of International Application No. PCT/KR2004/003162, filed Dec. 2, 2004, which claims priority to Korean Patent Application No. 2003-86615, filed on Dec. 2, 2003. The contents of the aforementioned applications are hereby incorporated by reference.

FIELD OF THE INVENTION

The present invention relates to an Internet Protocol-Private Branch Exchange (hereinafter, referred to as IP-PBX) for providing an instant messenger function and an Internet terminal for use therewith. More particularly, the present invention relates to an IP-PBX capable of providing an instant messenger service between Internet terminals by allowing the IP-PBX supporting a voice service and a data service by means of VoIP technology to have a function of an instant messenger server and an Internet terminal capable of using voice communication service and the instant messenger service at the same time.

BACKGROUND OF THE INVENTION

In modern society, wired telephones have been spread in almost every home. In particular, numerous wired telephones have been installed in large buildings, etc. An apparatus for connecting a plurality of wired telephones used in these large buildings to a Public Switched Telephone Network (hereinafter, referred to as PSTN) is a private branch exchange (hereinafter, referred to as PBX). That is, a PBX performs exchange and connection between extension phones used within a section of government offices, companies, factories or hotels, etc., or between an extension telephone and an office line telephone connected to a PSTN.

In the meantime, technology has been developed in the 1990's, which allows communication to be performed by means of computers connected to the Internet. In a method for allowing communication to be performed by means of computers connected to the Internet, predetermined communication programs are installed in the computers, the installed programs are then executed, and communication with the counterpart is performed. Further, connection to a specific web site (e.g., www.dialpad.co.kr or www.wowcall.co.kr), which provides an Internet communication service, is performed, and then communication with the counterpart is performed.

FIG. 1 is a block diagram schematically showing a conventional system for providing an Internet telephone service by means of an extension communication telephone.

A client computer 120 executes an Internet phone communication program used for enabling communication using the Internet 100 to be performed or connects to a specific web site providing an Internet phone communication service through the Internet 100, thereby allowing communication with the user of a general phone or an extension phone to be performed. The client computer 120 includes a microphone for inputting voice for communication and a headphone for listening voice or a headset 122 for inputting and listening voice.

An extension communication service unit 130 is connected to the Internet 100 through a VoIP gateway 140 and enables communication using the Internet 100 to be performed. The extension communication service unit 130 includes a plurality of extension telephones 132 and 133 for communication and a PBX 134 which is connected to the extension telephones 132 and 133 and transmits/receives data to/from the communication apparatus of the counterpart through the Internet 100.

Herein, the VoIP gateway 140 is an apparatus for enabling communication to be performed between the extension telephone 132 and another communication terminal by means of the Internet. That is, after the communication between the extension telephone 132 and another communication terminal is performed, the VoIP gateway 140 enables voice information to be exchanged between a speaker and a listener through the Internet 100.

A VoIP represents communication technology using the Internet, which allows both data and voice to be transferred by an Internet protocol on the Internet. Further, VoIP technology has an advantage in that it provides a telephone service using an existing Internet protocol network as is, so that line cost required for conventional telephone communication or fax transmission can be greatly reduced, thereby enabling telephone users to use an out-of-town and international telephone service on the Internet or Intranet environments at a low cost.

Telephones 180 and 181 are connected to a PSTN 170 and perform communication through the Internet 100. The PSTN 170 is connected to the Internet 100 through a VoIP gateway 160 and provides an exchange service of voice data between a speaker and a listener.

An Internet telephone service unit 150 is connected to the VoIP gateways through the Internet 100 and provides an Internet telephone service among the client computer 120, the extension telephones 132 and 133 and the telephones 180 and 181. That is, the Internet telephone service unit 150 performs a function of receiving communication request from the VoIP gateways 140 and 160 and the client computer 120 through the Internet 100 and dialing to the communication terminal of the counterpart.

However, the conventional PBX described in FIG. 1 provides only analog voice communication between plural telephones and requires a separate solution or a VoIP gateway in order to be connected to the Internet, etc. Accordingly, in order to overcome the disadvantages of the conventional PBX, a new PBX, that is, an IP-PBX, has been developed.

The IP-PBX transmits/receives not only analog voice information but also various digital data. Therefore, the IP-PBX provides various functions such as communication functions between general telephones, communication functions using a general telephone and a computer connected to the Internet, Voice Mail Service (VMS) functions, FAX functions. That is, the IP-PBX may be referred to as an apparatus obtained by incorporating a PBX, a VoIP gateway, a gatekeeper, etc., into one apparatus.

Recently, a message transmission/reception service, a chatting service and a data transmission/reception service have been widely spread between users of a computer or a mobile communication terminal including a specific program. In addition, an instant messenger service for reporting connection fact or connection status of a specific user has been widely spread. In particular, an instant messenger provides a voice communication service of one-to-one or one-to-many persons by means of VoIP technology, in addition to a text-centered message transmission service or a chatting service.

FIG. 2 is a block diagram schematically showing a conventional instant messenger service system 200 using an IP-PBX 220.

In the conventional instant messenger service system 200 using the IP-PBX 220, a client terminal unit 210 of one side and a client terminal unit 240 of the other side, which request an instant messenger service, are connected to each other through the IP-PBX 220, and a separate messenger server 230 is connected to the IP-PBX 220, so that a transmission/reception function of message data is performed. Further, predetermined messenger software is installed and executed in each of the client terminal units 210 and 240, so that input data are transferred to the IP-PBX 220 through a dedicated line, a wireless Local Area Network (hereinafter, referred to as LAN), etc. Herein, terminal apparatuses contained in each of the client terminal units 210 and 240 may include Personal Computers (hereinafter, referred to as PCs) 210a and 240a, Internet terminals 210b and 240b, Personal Digital Assistants (hereinafter, referred to as PDAs) 210c and 240c, etc. The IP-PBX 220 transfers data, which are received from each of the client terminal units 210 and 240, to the messenger server 230.

The messenger server 230 authenticates each of the client terminal units 210 and 240 connected to the messenger server 230 through the IP-PBX 220 and users of the client terminal units 210 and 240, and transfers data received through inter-working with the IP-PBX 220 to the corresponding client terminal units 210 and 240. Further, the messenger server 230 processes not only transmission/reception function of an instant message but also various functions in a wired connection status with the IP-PBX 220. Herein, the various functions may include file transmission functions, group conversation functions, checking functions regarding whether communication partners are in an online status or not, and management functions for a list of communication partners.

However, in the instant messenger service system 200 described in FIG. 2, the separate messenger server 230 must be installed for providing a messenger service, so that the construction of a network is complicated and additional cost for buying and installing the server is required. Further, the client terminal units 210 and 240 using the messenger service do not support voice communication service and the messenger service at the same time. That is, the terminal apparatuses of the client terminal units 210 and 240 using the messenger service cannot use the voice communication service while using the messenger service. Therefore, the terminal apparatuses can use the voice communication service only when using separate telephones.

SUMMARY OF THE INVENTION

Therefore, the present invention has been made in view of the above-mentioned problems, and it is an object of the present invention to provide an IP-PBX capable of providing an instant messenger service between Internet terminals by allowing the IP-PBX supporting a voice service and a data service by means of VoIP technology to have a function of an instant messenger server and an Internet terminal capable of using voice communication service and an instant messenger service at the same time.

According to one aspect of the present invention, there is provided an Internet protocol-private branch exchange having an instant messenger function, the Internet protocol-private branch exchange comprising: a private branch exchange unit for performing transmission/reception of voice and data among an office line telephone, an extension telephone, a computer and a wired/wireless Internet terminal after being connected to a public switched telephone network, an extension network and an Internet protocol network; a messenger server unit for transmitting/receiving an instant message, a file and an e-mail by using instant messenger software executed in the computer and/or the wired/wireless Internet terminal after being connected to the computer and the wired/wireless Internet terminal, and providing and managing at least one of the functions of providing information for current status, position or address book of connected users and notifying reception of the e-mail by executing the instant messenger software; and a central controller for providing an inter-working function between the PBX unit and the messenger server unit, and temporarily holding provision of an instant messenger service and controlling a voice communication service to be provided between communication terminals requiring voice communication when a voice communication service request signal is received through the instant messenger software while the instant messenger service is being provided through the messenger server unit.

According to another aspect of the present invention, there is provided an Internet terminal having an instant messenger function, the Internet terminal comprising: a program storage unit for storing at least one operation system and instant messenger software; a display unit for displaying data including an instant message transmitted/received through the instant messenger software; a data input unit for inputting an execution command or an execution end command of the instant messenger software or inputting data to be transmitted through the executed instant messenger software; a network interface card for transmitting the data inputted through the executed instant messenger software or receiving data transmitted through a communication network; a VoIP (Voice over Internet Protocol) chip for encoding or decoding voice data or image data transmitted or received through the communication network, transmitting or reproducing the encoded or decoded data, processing a dual tone multi frequency, and removing echo; and a microprocessor for providing voice communication, data transmission and an instant messenger service, and temporarily holding the instant messenger service being provided and generating/transmitting a voice communication request signal when a key value for a voice communication request is inputted while the instant messenger service is being provided.

According to further another aspect of the present invention, there is provided an instant messenger service system for providing an instant messenger service by means of an Internet protocol-private branch exchange having an instant messenger function, the instant messenger service system comprising: at least one communication terminal for storing at least one instant messenger software, and using the instant messenger service through wired local area network communication and/or wireless local area network communication; a communication network being connected to the communication terminal, for supporting the wired local area network communication and/or the wireless local area network communication; and the Internet protocol-private branch exchange for providing the instant messenger service and a voice communication service between the communication terminals after being connected to the communication network, and providing the voice communication service by means of VoIP (Voice over Internet Protocol) technology when a request of the voice communication service is received from a specific communication terminal receiving the instant messenger service.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
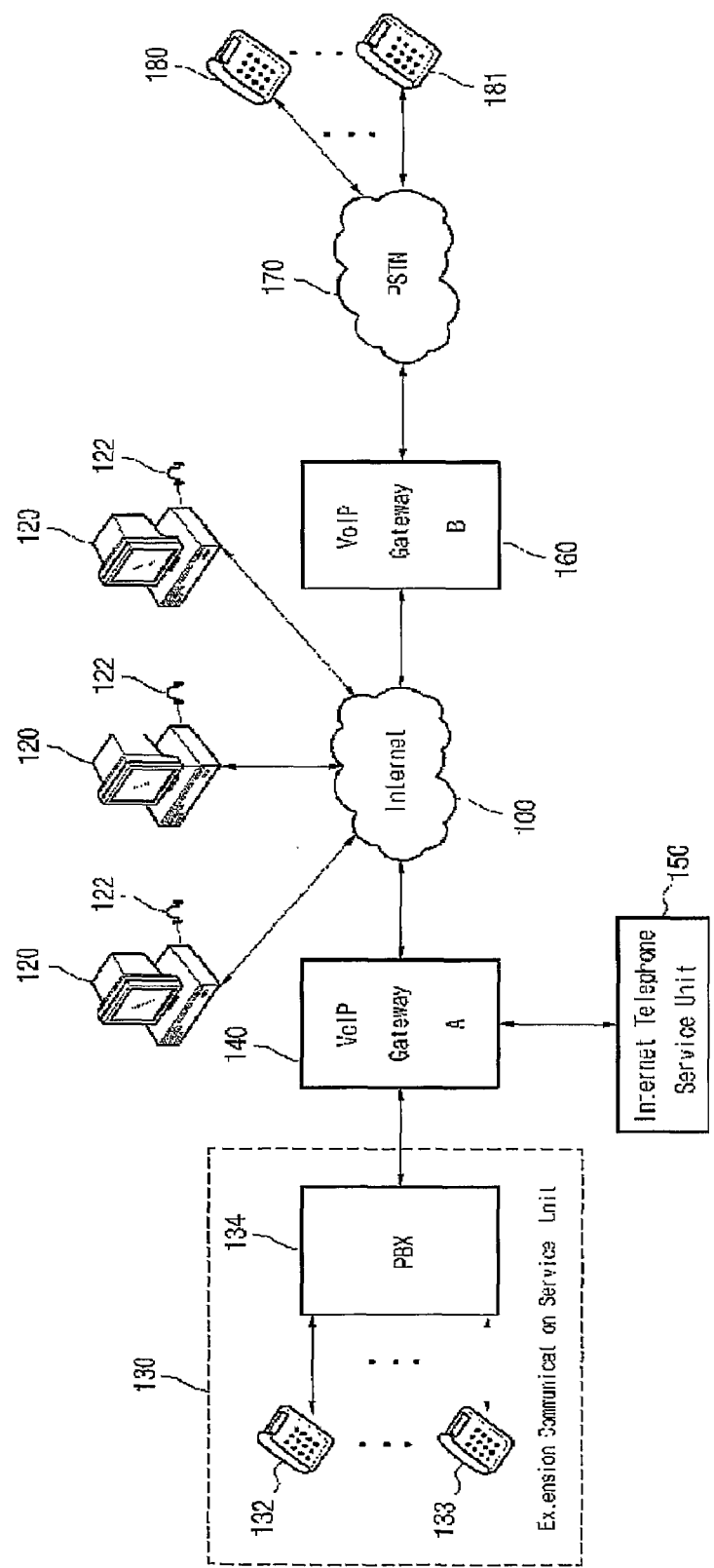
FIG. 1 is a block diagram schematically showing a conventional system for providing an Internet telephone service by means of an extension communication telephone.
Figure 2:
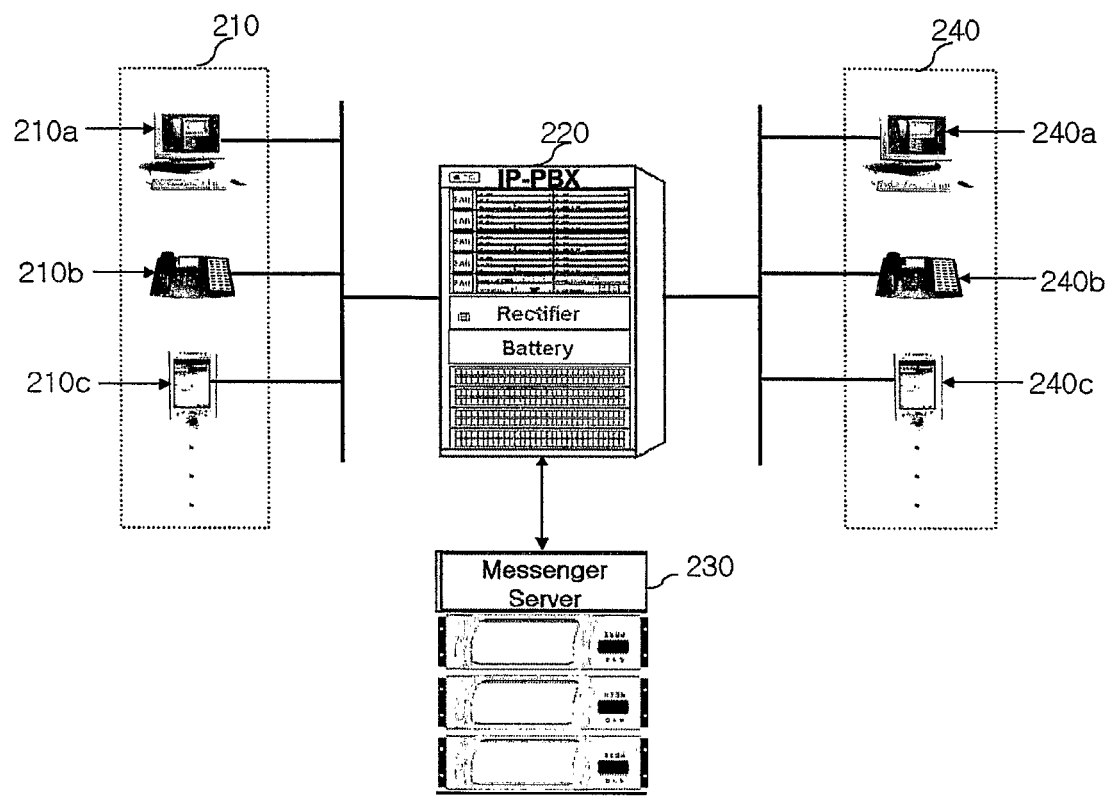
FIG. 2 is a block diagram schematically showing a conventional instant messenger service system using an IP-PBX.

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

Figure 3:
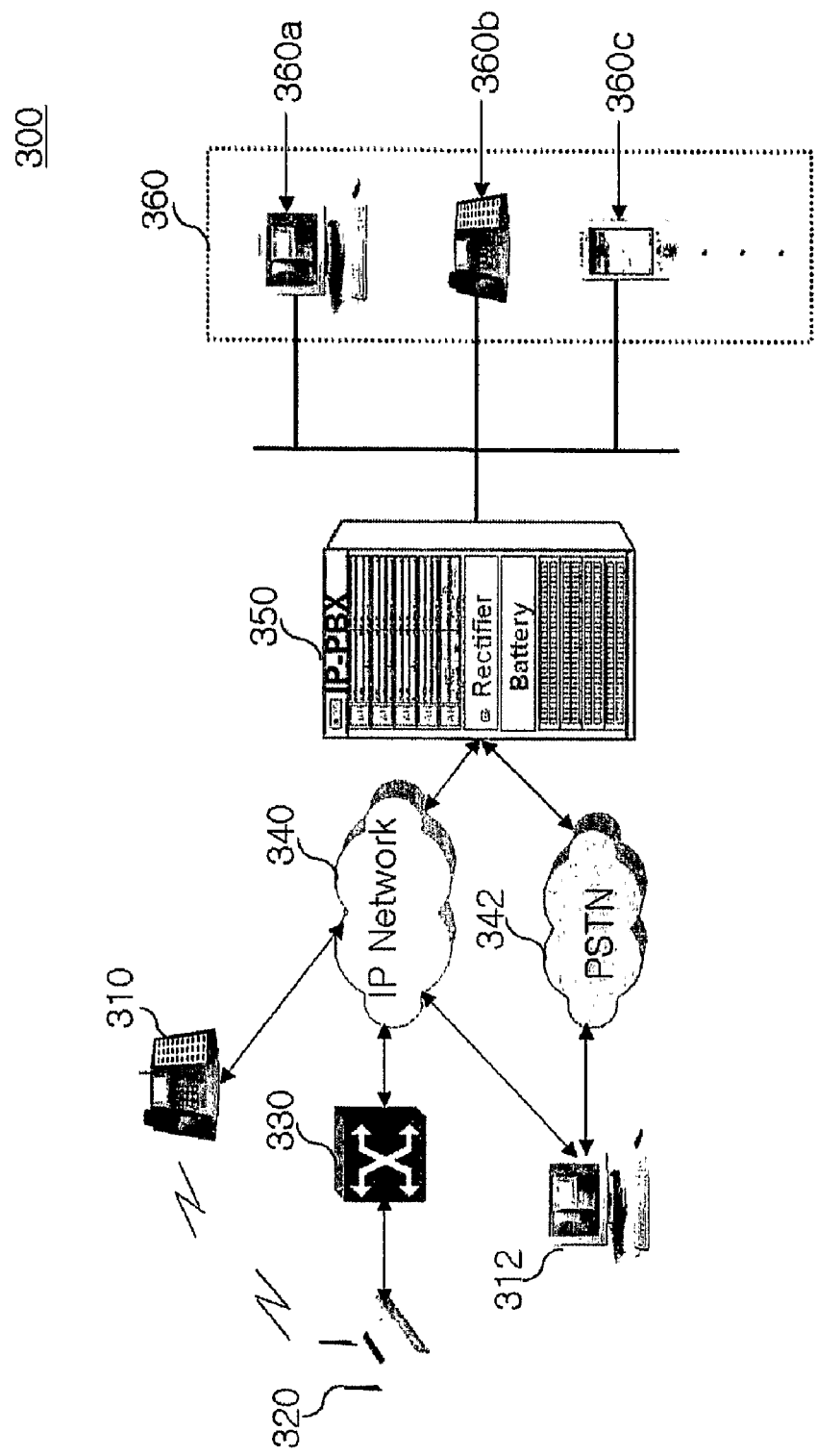
FIG. 3 is a block diagram schematically showing an instant messenger service system which uses an IP-PBX having an instant messenger function according to an embodiment of the present invention.

FIG. 3 is a block diagram schematically showing an instant messenger service system 300 which uses an IP-PBX 350 having an instant messenger function according to an embodiment of the present invention.

The instant messenger service system 300 according to the embodiment of the present invention includes an Internet terminal 310, an Access Point (hereinafter, referred to as AP) 320, a hub 330, an IP network 340, the IP-PBX 350, a client terminal unit 360, etc. Herein, a PC 312 may be connected to the IP-PBX 350 through a PSTN 342.

After the Internet terminal 310 is connected to the IP-PBX 350 via the AP 320, the hub 330 and the IP network 340 by means of a Radio Frequency (hereinafter, referred to as RF) communication or connected to the IP-PBX 350 through the IP network 340, the Internet terminal 310 uses an instant messenger service with terminal apparatuses, for example, a PC 360a, a wired Internet terminal 360b and a PDA 360c, which are included in the client terminal unit 360 using the instant messenger service.

The Internet terminal 310 according to the embodiment of the present invention includes at least one messenger software, for example, an MSN messenger, a YAHOO messenger, a DAUM messenger, a Genie, a Buddy Buddy, etc., for using the messenger service.

Further, the Internet terminal 310 includes a wireless LAN card for wireless LAN communication and an Ethernet card for Ethernet communication. A wireless LAN_is a communication scheme in which a user can use the ultra high speed Internet within a predetermined distance around a place, at which an AP has been installed, by means of a PDA, a wireless Internet terminal or a notebook computer through an RF_communication. Further, the Internet terminal 310 according to the embodiment of the present invention includes a construction required for voice communication, similarly to the case of a general Internet terminal.

Furthermore, the messenger software installed in the Internet terminal 310 is executed the instant the Internet terminal 310 is powered on, so that the Internet terminal 310 automatically logs in to the IP-PBX 350. Herein, when the wireless Internet terminal 310 logs in to the IP-PBX 350, a Media Access Control (hereinafter, referred to as MAC) address assigned to the wireless Internet terminal 310 is transmitted to the IP-PBX 350. The IP-PBX 350 performs a login function by means of the received MAC address. Herein, the MAC address becomes a wireless LAN MAC address when the wireless Internet terminal 310 is connected to the IP-PBX 350 by means of a wireless LAN card or becomes an Ethernet MAC address when the wireless Internet terminal 310 is connected to the IP-PBX 350 by means of an Ethernet card.

Further, the construction of the wireless Internet terminal 310, which supports voice communication and includes an instant messenger function, according to the embodiment of the present invention will be described in detail with reference to FIG. 4.

The AP 320 is an apparatus for supporting an inter-working function between the wireless Internet terminal 310 and a wired LAN. That is, the AP 320 performs an Internetwork Packet Exchange/IP (IPX/IP) routing function and a bridging function between the wireless Internet terminal 310 and the wired LAN. Further, the AP 320 is connected to the IP network 340 through the hub 330 and then connected to the IP-PBX 350.

The IP-PBX 350 is an apparatus obtained by incorporating a VoIP gateway, a gatekeeper and a Multipoint Control Unit (MCU), which are basic elements of a VoIP communication system, into one apparatus. Further, the IP-PBX 350 provides not only a function of providing voice communication, transmission/reception of data, a supplementary service, etc., but also various instant messenger service functions according to the embodiment of the present invention. That is, the IP-PBX 350 performs a function of managing the IP address data of the wireless Internet terminal 310 and the PC 312 registered in the IP-PBX 350, and providing a connection status (e.g., offline status, online status), a current status (e.g., being absent, away, be in conference) set by a user, location information of a user, etc.

Further, the IP-PBX 350 supports the general function of an IP-PBX, which provides voice communication function or transmission/reception function of data with not only the wireless Internet terminal 310 using a wireless LAN communication or a wired LAN communication shown in FIG. 3 but also the PC 312 connected to the IP-PBX 350 through the PSTN 342, a wired telephone connected to the IP-PBX 350 through the PSTN 342 or directly connected to the IP-PBX 350, a facsimile, etc.

Further, the IP-PBX 350, which supports voice/data communication and provides the instant messenger service, according to the embodiment of the present invention will be described in detail with reference to FIG. 5.

The client terminal unit 360 is a terminal apparatus using the instant messenger service with the wireless Internet terminal 310 or the PC 312 after being connected to the IP-PBX 350 by wireless or by wire. The client terminal unit 360 may include a PC 360', a wired Internet terminal 360", a PDA 360''', etc., and a wireless Internet terminal may also be connected to the IP-PBX 350 through the AP or the IP network.

Figure 4:
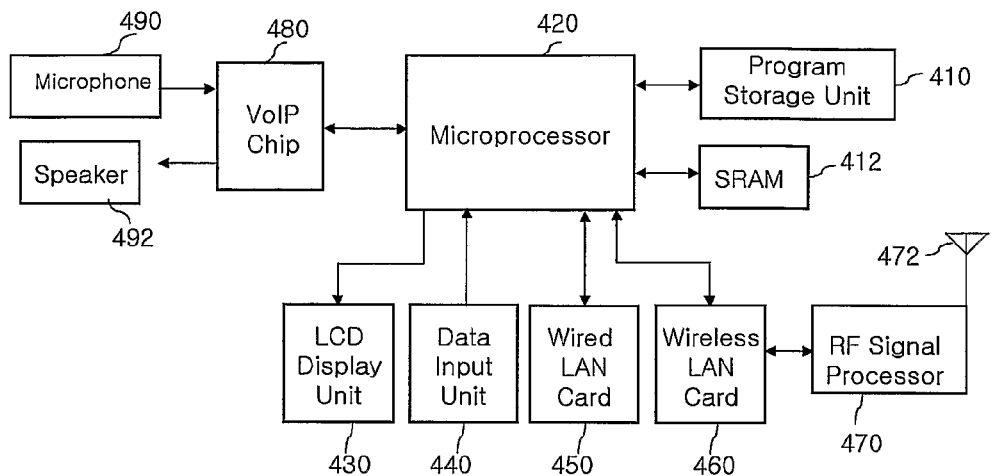
FIG. 4 is a block diagram schematically showing the construction of an Internet terminal according to an embodiment of the present invention.

FIG. 4 is a block diagram schematically showing the construction of the Internet terminal 310 according to the embodiment of the present invention.

The Internet terminal 310 according to the embodiment of the present invention includes a program storage unit 410, a Static Random Access Memory (hereinafter, referred to as SRAM) 412, a microprocessor 420, a Liquid Crystal Display (hereinafter, referred to as LCD) display unit 430, a data input unit 440, a wired LAN card 450, a wireless LAN card 460, an RF signal processor 470, a VoIP chip 480, a microphone 490, a speaker, etc.

The program storage unit 410 stores at least one instant messenger software. The instant messenger software stored in the program storage unit 410 is executed in a memory space of the SRAM 412 by the microprocessor 420. Herein, when new instant messenger software is downloaded to the Internet terminal 310 from a wireless/wired web site, the downloaded instant messenger software may be newly stored in the program storage unit 410. Further, the program storage unit 410 may include a Flash Read Only Memory (ROM), an Electrically Erasable Programmable ROM (EEPROM), etc.

In the meantime, the instant messenger software stored in the program storage unit 410 may provide all functions similar to instant messenger software installed in a PC. For example, the instant messenger software stored in the program storage unit 410 provides a function of adding communication partners, checking whether communication partners are in online status or not, sending instant messages, dialing the partner, transmitting data, transmitting a Short Message Service (SMS) messages, reporting arrival of e-mail, etc.

The microprocessor 420 performs a function of generally controlling the Internet terminal 310. For example, the microprocessor 420 provides a voice communication function when voice communication is requested by a user, or executes the instant messenger software and provides an instant messenger service when the instant messenger service is requested. That is, when a dialing is performed by means of the key matrix of the Internet terminal 310, the microprocessor 420 controls the voice communication function to be provided through the VoIP chip, 480. Further, when the instant messenger service is requested, the microprocessor 420 executes a specific instant messenger software stored in the program storage unit 410 and controls the instant messenger service to be provided through a wired LAN communication or a wireless LAN communication.

Further, the microprocessor 420 transmits information for a current status (e.g., online status, being out, be in conference, away, be at table, etc) of a user to the IP-PBX 350, which has been set on an instant messenger by an operation of the data input unit 440.

Furthermore, when the voice communication function provided by the instant messenger software is requested while the instant messenger service is being provided, the microprocessor 420 temporarily stops the instant messenger service, generates a voice communication request signal to a partner communication terminal having requested the voice communication, and transmits the generated voice communication request signal to the IP-PBX 350. Then, the IP-PBX 350 receiving the voice communication request signal generates a communication channel with the partner communication terminal and provides a voice communication service between the two communication terminals.

The LCD display unit 430 displays data, such as texts, images, dynamic images, received from the microprocessor 420. That is, the LCD display unit 430 displays instant messages inputted from a user, instant messages received through a communication network, or dynamic images while the Internet terminal 310 uses the instant messenger service. Further, the LCD display unit 430 displays information for a nickname, an e-mail address, a current status of another subscriber registered in an instant messenger software being executed as a communication partner.

The data input unit 440 includes a plurality of key buttons for inputting numbers such as telephone numbers and characters. These key buttons typically include 12 number keys (0~9, *, #), a plurality of function keys, a scroll key, etc. Accordingly, a user may perform a dialing or input an instant message by operating the number keys, the function keys and the scroll key included in the data input unit 440.

The wired LAN card 450 provides a wired LAN communication function. The ROM of the wired LAN card 450 stores specific MAC address information of each wired LAN card 450. Further, an Ethernet card may be used as the wired LAN card 450.

The wireless LAN card 460 provides a wireless LAN communication function. The ROM of the wired LAN card 450 also stores specific MAC address information of each wireless LAN card 460. Herein, the MAC address represents address information having a length of 48 bits. Accordingly, when information for a wireless LAN user is stored using the MAC address as a key value, it is possible to check the location of the user. That is, in IP based wireless LAN environments, an AP manages the IP addresses and MAC addresses of wireless terminal apparatuses connected to the AP.

Accordingly, the IP-PBX 350 described in FIG. 3 manages the identification information and position information of each AP 320 connected to the IP-PBX 350, understands the MAC addresses of the Internet terminal 310 connected to each AP 320, and understands the position of the Internet terminal 310 by the area controlled by the AP 320.

In the meantime, the wired LAN card 450 and the wireless LAN card 460 may be named a Network Interface Card (NIC).

The RF signal processor 470 performs a function of modulating data and/or transmission signals received from the wireless LAN card 460 and sending the modulated data and/or the transmission signals to the air through an RF antenna 472. Further, the RF signal processor 470 performs a function of demodulating and amplifying RF signals received through the RF antenna 472 and transferring the amplified RF signals to the microprocessor 420.

The VoIP chip 480 performs a function of encoding or decoding transmitted or received voice data or image data under the control of the microprocessor 420, processing a Dual Tone Multi Frequency (hereinafter, referred to as DTMF), and removing echo, etc. The VoIP chip 480 stores an audio codec or a video codec for reproducing voice data or image data.

Further, the VoIP chip 480 stores a VoIP communication protocol for supporting the voice communication function using VoIP technology. Furthermore, the VoIP chip 480 embedded in the Internet terminal 310 according to the embodiment of the present invention may store a VoIP communication protocol such as a H.323 protocol, a Session Initiation Protocol (SIP), a Media Gateway Control Protocol (MGCP) and Media Gateway Control (MEGACO).

The microphone 490 converts voice input of a user into electrical signals and transfers the electrical signals to the VoIP chip 480. The speaker 492 converts sound data transferred from the VoIP chip 480 into audible sound and outputs the audible sound.

Figure 5:
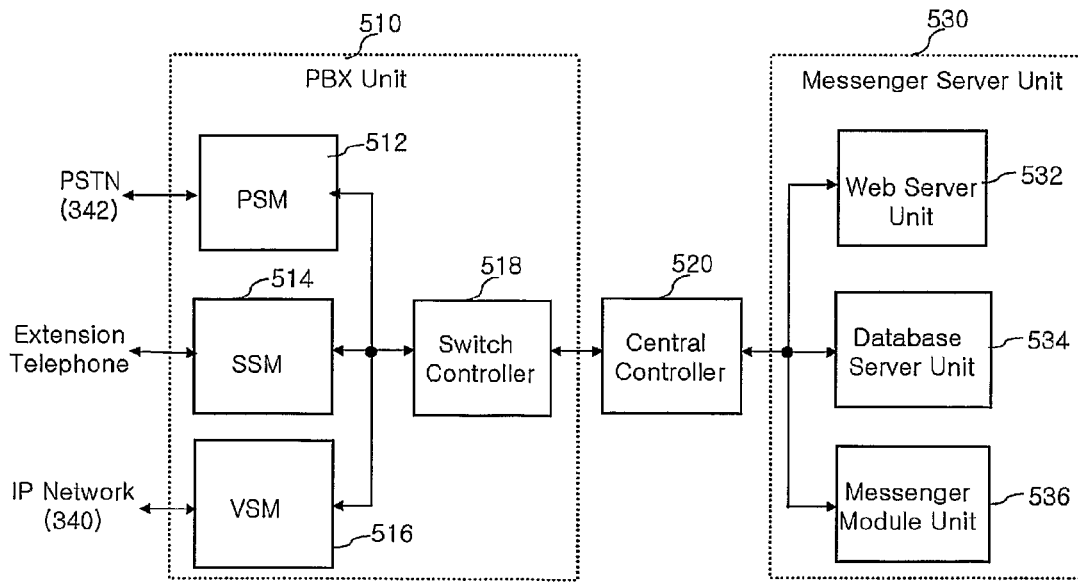
FIG. 5 is a block diagram schematically showing the construction of an IP-PBX having an instant messenger function according to an embodiment of the present invention.

FIG. 5 is a block diagram schematically showing the construction of the IP-PBX 350 having an instant messenger function according to the embodiment of the present invention.

The IP-PBX 350 having the instant messenger function according to the embodiment of the present invention includes a PBX unit 510, a central controller 520 and a messenger server unit 530. Herein, the PBX unit 510 includes a Public Switch Module (hereinafter, referred to as PSM) 512, a Subscriber Switch Module (hereinafter, referred to as SSM) 514, a VoIP Switch Module (hereinafter, referred to as VSM) 516 and a switch controller 518. The messenger server unit 530 includes a web server unit 532, a database server unit 534 and a messenger module unit 536.

The PSM 512 performs an office line termination function, an office line originating function, a line status monitoring function, etc. By the office line termination function, the PSM 512 matches with the PSTN 342, which is an office line network, detects incoming signals from an office line subscriber, and forms a communication channel with the office line subscriber. By the office line originating function, the PSM 512 analyzes an office line number of an office line subscriber and transmits the office line number through a DTMF. By the line status monitoring function, the PSM 512 monitors the status of a communication line and releases the communication channel when communication is ended.

The SSM 514 analyzes DTMF signals inputted from a plurality of extension telephones connected to the SSM 514, sets a communication call to a corresponding extension telephone, and connects or releases a communication call connected from the PSM 512.

The VSM 516 modulates voice data, which have been received from the PSM 512 and the SSM 514, by means of VoIP technology so as to transmit the voice data through the IP network 340 such as the Internet. That is, from among analog voice signals inputted to the PSM 512 and the SSM 514, analog voice signals to be transmitted to a PC or a wireless Internet terminal instead of a general telephone are transmitted to the VSM 516. Accordingly, when a communication channel is formed between extension telephones, between an office line telephones, or between an extension telephone and an office line telephone, analog voice signals inputted to the PSM 512 and the SSM 514 are directly transmitted to a corresponding telephone without passing through the VSM 516.

The switch controller 518 performs a function of controlling the PSM 512, the SSM 514 and the VSM 516, controlling allocation of a communication channel through the IP-PBX 350 and transmission/reception of various data through the allocated communication channel, etc.

The central controller 520 performs a function of generally controlling the operation of the IP-PBX 350 according to the embodiment of the present invention. That is, when receiving a voice communication request signal, the central controller 520 controls the switch controller 518 of the PBX unit 510 so as to provide a voice communication service. Further, when receiving an instant messenger request signal, the central controller 520 controls the messenger server unit 530 so as to provide an instant messenger service.

Further, when voice communication using a voice communication function provided by instant messenger software is requested while an instant messenger service is being provided between specific communication terminals such as the wireless Internet terminals 310, the central controller 520 controls a communication channel to be formed by means of the telephone numbers of the two corresponding communication terminals.

The web server unit 532 performs a function of constructing and managing a wired website or a wireless website by means of a stored script language such as a Professional HyperText Preprocessor (PHP), a perl and an active server page. Herein, since at least one instant messenger software is registered in the website managed by the web server unit 532, a user can receive and install the instant messenger software through the web server unit 532 by means of a wireless Internet terminal, etc. The web server unit 532 according to the embodiment of the present invention may be constructed by an Apache server, a Netscape Enterprise Server (NES), an Internet Information Server (IIS), etc.

The database server unit 534 stores personal information (e.g., an ID, a password, an e-mail address, a wired/wireless telephone number) of a user registered in the web server unit 532 as a member. Further, the database server unit 534 performs a function of authenticating members, managing a website, managing a list of communication partners according to each member, and managing a current status according to each member through inter-working with the web server unit 532. Such a database server unit 534 can be realized according to the object of the present invention by means of a Relational Database Management System (RDBMS) such as a MySQL, an Oracle, an Informix and a Sybase, an Object-Oriented Database Management System (OODBMS) such as a Gemston, an Orion and an $O_2$, and an XML Native Database such as an Excelon, a Tamino and a Sekaiju. Further, the database server unit 534 includes proper fields or elements for achieving the functions of the database server unit 534.

The messenger module unit 536 performs a function of providing the instant messenger service between one or more communication terminals through the IP-PBX 350 under the control of the central controller 520. Herein, the instant messenger service includes transmission/reception of an instant message, transmission/reception of a dynamic image for a video chatting, transmission/reception of a file, a voice communication function, an e-mail transmission function, a notification function of an e-mail reception, a generation function of a list of communication partners, a providing function of current status information of a communication partner, etc.

In the meantime, while an exchange function of an instant message is being provided between the Internet terminals 310 and/or between the Internet terminal 310 and the PC 312 through the messenger module unit 536, when a voice communication request is received from the Internet terminal 310 or the PC 312 of one side, the IP-PBX 350 checks a communication network to which the counterpart communication apparatus is connected. That is, the IP-PBX 350 checks whether the communication network to which the counterpart communication apparatus is connected is the PSTN 342, an extension network or the IP network 340 by means of the telephone number of the counterpart communication apparatus. In other words, when the counterpart communication apparatus is connected to the PSTN 342, the IP-PBX 350 provides a voice communication function through the PSM 512. When the counterpart communication apparatus is connected to the extension network, the IP-PBX 350 provides the voice communication function through the SSM 514. Further, When the counterpart communication apparatus is connected to the IP network 340 such as the Internet, the IP-PBX 350 provides the voice communication function through the VSM 516.

Figure 6:
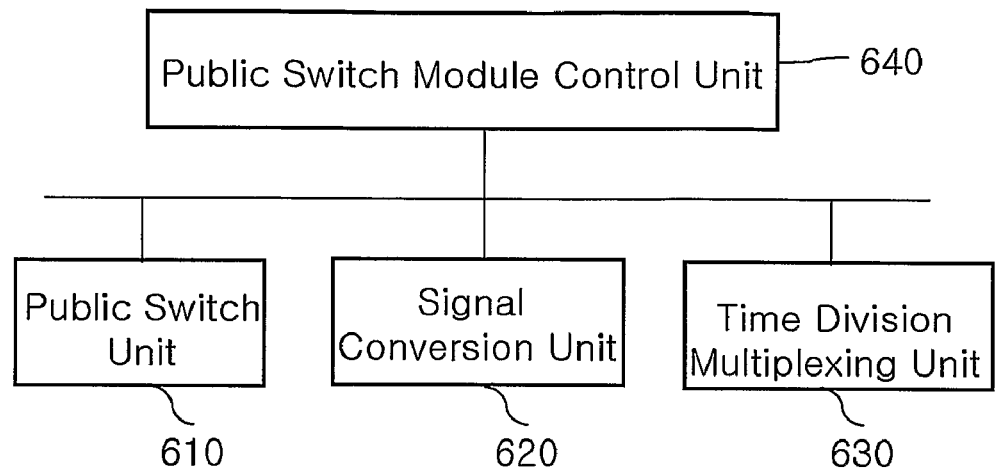
FIG. 6 is a block diagram showing the construction of a PSM according to an embodiment of the present invention.

FIG. 6 is a block diagram showing the construction of the PSM 512 according to the embodiment of the present invention.

The PSM 512 includes a public switch unit 610, a signal conversion unit 620, a time division multiplexing unit 630, and a public switch module control unit 640.

The public switch unit 610 performs a signal matching with the PSTN 342, and receives and processes analog voice data transferred from an office line subscriber through the PSTN 342.

The signal conversion unit 620 compresses and encodes analog voice data of an office line subscriber into Differential Pulse Code Modulation (hereinafter, referred to as DPCM) data and transfers the DPCM data to the time division multiplexing unit 630. Further, the signal conversion unit 620 restores digital voice data from the VSM 516 into analog voice data and transfers the analog voice data to the PSTN 342.

The time division multiplexing unit 630 time-division multiplexes the voice DPCM data converted by the signal conversion unit 620 and transmits the multiplexed voice DPCM data to the VSM 516.

The public switch module control unit 640 controls and manages the public switch unit 610, the signal conversion unit 620 and the time division multiplexing unit 630, and supports communication with the PSM 512 and the VSM 516 of the IP-PBX 350.

Figure 7:
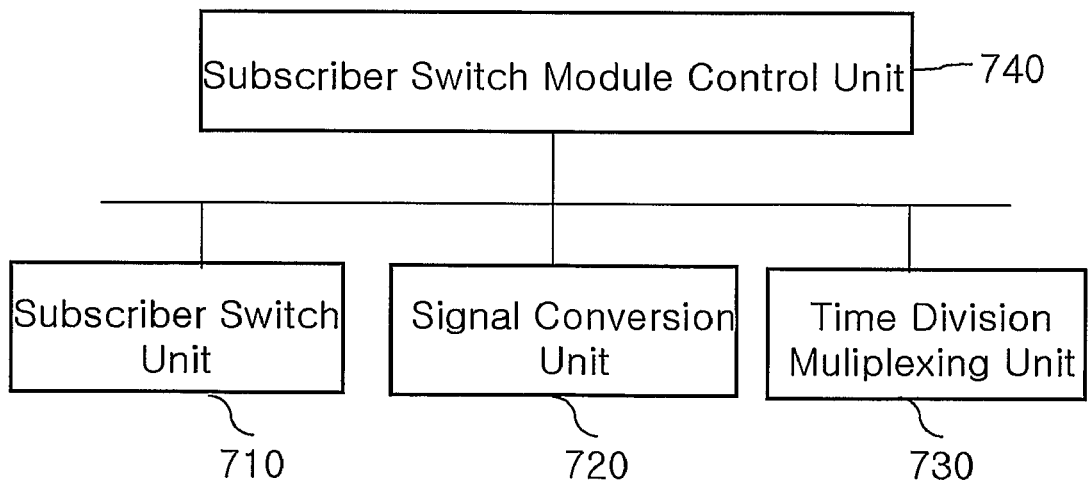
FIG. 7 is a block diagram showing the construction of a SSM according to an embodiment of the present invention.

FIG. 7 is a block diagram showing the construction of the SSM 514 according to the embodiment of the present invention.

The SSM 514 includes a subscriber switch unit 710, a signal conversion unit 720, a time division multiplexing unit 730, and a subscriber switch module control unit 740.

The subscriber switch unit 710 performs an electrical matching function of basically supplying power to an extension telephone network of an extension telephone, generating a ring signal for the extension telephone, generating a Call Progress Tone (CPT) regarding Ring, Busy and response status from the extension telephone, and detecting that a DTMF key is pushed from the extension telephone. Further, the subscriber switch unit 710 takes charge of an electrical matching with the PSM 512, receives analog voice data of an office line subscriber transferred from the PSM 512 and transfers the analog voice data to the extension telephone of an extension subscriber.

The signal conversion unit 720 encodes analog voice signals of an extension subscriber transferred from the extension telephone into DPCM data, decodes voice data generated by the extension telephone into analog signals and transfers the analog signals to the PSM 512.

The time division multiplexing unit 730 time-division multiplexes the DPCM data of the extension subscriber encoded by the signal conversion unit 720, and transfers the multiplexed DPCM data to the PSTN 342.

The subscriber switch module control unit 740 controls and manages the subscriber switch unit 710, the signal conversion unit 720 and the time division multiplexing unit 730, and supports communication with the PSM 512 and the VSM 516 of the IP-PBX 350.

Figure 8:
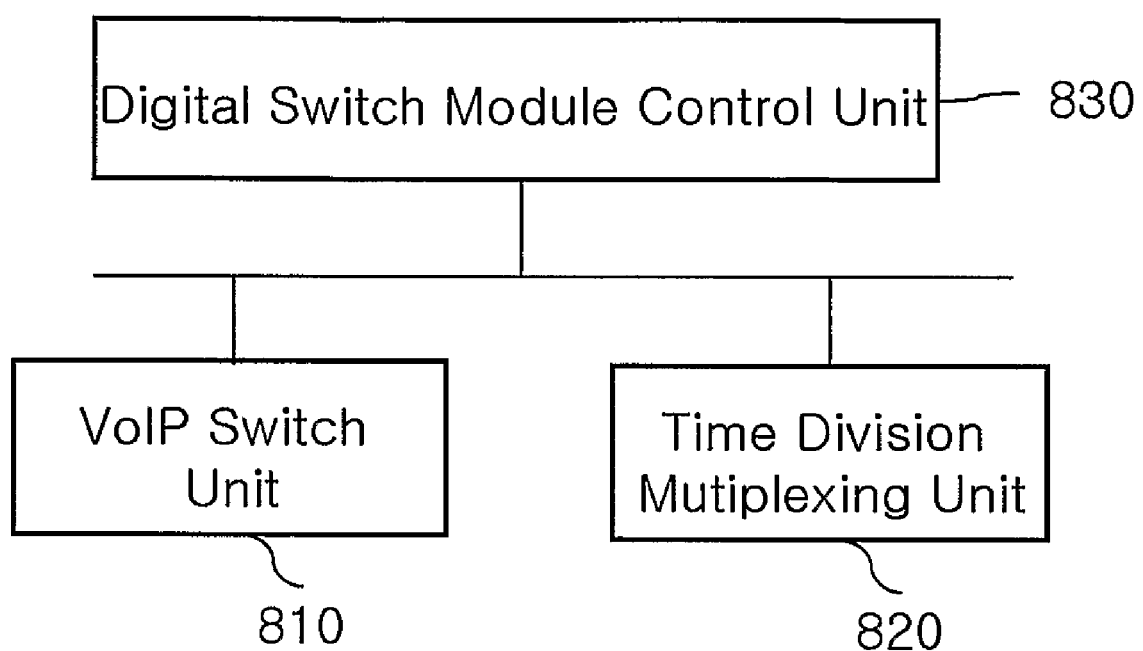
FIG. 8 is a block diagram showing the construction of a VSM according to an embodiment of the present invention.

FIG. 8 is a block diagram showing the construction of the VSM 516 according to the embodiment of the present invention.

The VSM 516 includes a VoIP switch unit 810, a time division multiplexing unit 820 and a digital switch module control unit 830.

The VoIP switch unit 810 compresses and encodes the DPCM data received through the PSM 512 or the VSM 516, and transfers the processed data to the IP network 340.

The time division multiplexing unit 820 time division multiplexes voice data of the extension subscriber received in VoIP switch unit 810, and transfers the processed data to the PSM 512.

The digital switch module control unit 830 controls and manages the VoIP switch unit 810 and the time division multiplexing unit 820, and controls communication to be performed with the PSM 512 and the VSM 516 of the IP-PBX 350.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

As described above, since a conventional IP-PBX does not include an instant messenger function, the IP-PBX cannot provide a messenger service without inter-working with a separate messenger server. However, according to the present invention, an IP-PBX includes a function of an instant messenger server, thereby providing an instant messenger service simply and conveniently even without installing a separate messenger server.

Further, according to the present invention, conventional instant messenger software, which can be used between computer devices connected to the Internet or between mobile communication terminals through a mobile communication network, is stored in a wireless Internet terminal using VoIP technology, so that it is possible to use an instant messenger service quickly and conveniently in an area including an AP by means of a wireless LAN communication scheme.

Furthermore, according to the present invention, when an IP-PBX is applied to Virtual Private Network (VPN) environments, the IP-PBX functions as an integrated switching apparatus for transmitting/receiving voice, data and instant messages. Accordingly, the IP-PBX can provide a communication function between staffs within the company quickly and exactly and provide extension communication within the company for free.

What is claimed is:

1. An Internet protocol-private branch exchange having an instant messenger function, the Internet protocol-private branch exchange comprising:

a private branch exchange unit for performing transmission/reception of voice and data among an office line telephone, an extension telephone, a computer and a wired/wireless Internet terminal after being connected to a public switched telephone network, an extension network and an Internet protocol network;

a messenger server unit for transmitting/receiving an instant message, a file and an e-mail by using instant messenger software executed in the computer and/or the wired/wireless Internet terminal after being connected to the computer and the wired/wireless Internet terminal, and providing and managing at least one of the functions of providing information for current status, position or address book of connected users and notifying reception of the e-mail by executing the instant messenger software; and a central controller for providing an inter-working function between the PBX unit and the messenger server unit, and temporarily holding provision of an instant messenger service and controlling a voice communication service to be provided between communication terminals requiring voice communication when a voice communication service request signal is received through the instant messenger software while the instant messenger service is being provided through the messenger server unit.

2. The Internet protocol-private branch exchange as claimed in claim 1, wherein the private branch exchange unit includes:
- a public switch module for performing an office line incoming function of matching with the public switched telephone network and establishing a communication channel with an office line terminal, an office line outgoing function of analyzing an office line number and transmitting the office line number through a dual tone multi frequency, and a communication line status monitoring function of releasing the communication channel when voice communication is ended;
- a subscriber switch module for matching with the extension network, analyzing dual tone multi frequency signals inputted from an extension telephone, setting a communication call to a corresponding extension telephone, and connecting or releasing a communication call connected from the public switch module;
- a VoIP (Voice over Internet Protocol) switch module for modulating analog voice signals, which have been received from the public switch module and the subscriber switch module, into digital signals by means of VoIP technology so order to transmit the digital signals through the Internet protocol network; and
- a switch controller for respectively controlling the public switch module, the subscriber switch module and the VoIP switch module, allocating a communication channel and transmitting/receiving various data through the allocated communication channel.

3. The Internet protocol-private branch exchange as claimed in claim 2, wherein the private branch exchange unit performs a voice communication function through the Internet protocol network by means of at least one VoIP protocol of a H.323, a session initiation protocol, a media gateway control protocol and a MEGACO (MEdia GAteway COntrol).

4. The Internet protocol-private branch exchange as claimed in claim 1, wherein the messenger server unit includes:
- a web server unit for constructing and managing a wired website or a wireless website by means of at least one script language of a Professional HyperText Preprocessor, a perl and an active server page;
- a database server unit for storing personal information including an ID, a password, an e-mail address and a wired/wireless telephone number of a user registered in the web server unit as a member, and performing a function of authenticating members, managing a website, managing a list of communication partners according to each member, and managing a current status according to each member through inter-working with the web server unit; and
- a messenger module unit for providing the instant messenger service to at least one communication terminal under a control of the central controller.

5. The Internet protocol-private branch exchange as claimed in claim 4, wherein the communication terminal using the instant messenger service through the messenger module unit is a terminal having a display unit for displaying data transmitted/received through the instant messenger service, and includes at least one of a wired/wireless computer and a wired/wireless Internet terminal which are connected to an Internet or an office line network.

6. An Internet terminal having an instant messenger function, the Internet terminal comprising:
- a program storage unit for storing at least one operation system and instant messenger software;
- a display unit for displaying data including an instant message transmitted/received through the instant messenger software;
- a data input unit for inputting an execution command or an execution end command of the instant messenger software or inputting data to be transmitted through the executed instant messenger software;
- a network interface card for transmitting the data inputted through the executed instant messenger software or receiving data transmitted through a communication network;
- a VoIP (Voice over Internet Protocol) chip for encoding or decoding voice data or image data transmitted or received through the communication network, transmitting or reproducing the encoded or decoded data, processing a dual tone multi frequency, and removing echo; and
- a microprocessor for providing voice communication, data transmission and an instant messenger service, and temporarily holding the instant messenger service being provided and generating/transmitting a voice communication request signal when a key value for a voice communication request is inputted while the instant messenger service is being provided.

7. The Internet terminal as claimed in claim 6, wherein the instant messenger software provides at least one of a function of checking whether a communication partner is in an online status, a function of providing a current status of the communication partner, a function of transmitting/receiving data, a function of providing voice communication using VoIP technology, a function of transmitting/receiving the instant message, a function of notifying an e-mail reception, a function of authenticating a user, and a function of providing a video chatting.

8. The Internet terminal as claimed in claim 6, wherein the VoIP chip stores at least one VoIP protocol of a H.323, a session initiation protocol, a media gateway control protocol and a MEGACO (MEdia GAteway COntrol).

9. The Internet terminal as claimed in claim 6, wherein the network interface card includes at least one of a wireless local area network card for wireless local area network communication and a wired local area network card for wired local area network communication.

10. An instant messenger service system for providing an instant messenger service by means of an Internet protocol-private branch exchange having an instant messenger function, the instant messenger service system comprising:
- at least one communication terminal for storing at least one instant messenger software, and using the instant messenger service through wired local area network communication and/or wireless local area network communication;
- a communication network being connected to the communication terminal, for supporting the wired local area network communication and/or the wireless local area network communication; and
- the Internet protocol-private branch exchange for providing the instant messenger service and a voice communication service between the communication terminals after being connected to the communication network, and providing the voice communication service by means of VoIP (Voice over Internet Protocol) technology when a request of the voice communication service is received from a specific communication terminal receiving the instant messenger service.

11. The instant messenger service system as claimed in claim 10, wherein the communication terminal includes at least one of a wired Internet terminal, a wireless Internet terminal, an Internet terminal for both wired and wireless communication, a personal digital assistant and a computer.

12. The instant messenger service system as claimed in claim 10, wherein the communication network includes an access point, a hub and an Internet protocol network when the communication terminal includes at least one of the wireless Internet terminal, the Internet terminal for both wired and wireless communication and the personal digital assistant, and the communication network includes the Internet protocol network or a public switched telephone network when the communication terminal includes at least one of the wired Internet terminal, the Internet terminal for both wired and wireless communication and the computer.

13. The instant messenger service system as claimed in claim 10, wherein the Internet protocol-private branch exchange includes a private branch exchange unit and a messenger server unit in order to perform a function of checking whether a communication partner is in an online status, providing a current status of the communication partner, transmitting/receiving data, providing voice communication using VoIP technology, transmitting/receiving an instant message, notifying an e-mail reception, authenticating a user, and providing a video chatting, the private branch exchange unit including a public switch module, a subscriber switch module, a VoIP switch module and a switch controller, the messenger server unit including a web server unit, a database server unit and a messenger module unit.

14. The instant messenger service system as claimed in claim 10, wherein the Internet protocol-private branch exchange acquires and provides position information of each communication terminal by means of each media access control address information stored in wired local area network communication cards and/or wireless local area network communication cards installed in a wired Internet terminal, a wireless Internet terminal, an Internet terminal for both wired and wireless communication, a personal digital assistant and a computer.

15. The instant messenger service system as claimed in claim 10, wherein the Internet protocol-private branch exchange stores at least one VoIP protocol of a H.323, a session initiation protocol, a media gateway control protocol and a MEGACO (MEdia GAteway COntrol), and provides a VoIP voice communication service to each communication terminal.

* * * * *